United States Patent [19]
Graham et al.

[11] Patent Number: 5,262,106
[45] Date of Patent: Nov. 16, 1993

[54] ANISOTROPIC FIBER ALIGNMENT IN COMPOSITE STRUCTURES

[75] Inventors: Alan L. Graham, Los Alamos; Lisa A. Mondy, Cedar Crest; David C. Guell, Los Alamos, all of N. Mex.

[73] Assignee: The United States of America as represented by the United States Department of Energy, Washington, D.C.

[21] Appl. No.: 832,156

[22] Filed: Feb. 6, 1992

[51] Int. Cl.⁵ .................... B29B 11/16; C08J 3/03; C08J 3/07
[52] U.S. Cl. .................... 264/108; 523/315; 523/318
[58] Field of Search .................. 264/108; 523/315, 318

[56] References Cited

U.S. PATENT DOCUMENTS

| | | | |
|---|---|---|---|
| 3,168,509 | 2/1965 | Juel | 264/108 |
| 3,359,350 | 12/1967 | Godfrey | 264/108 |
| 4,463,058 | 7/1984 | Hood | 524/443 |
| 4,560,603 | 12/1985 | Giamcomel | 428/86 |
| 5,059,371 | 10/1991 | Saheki | 264/108 |

OTHER PUBLICATIONS

Vilani, Tom, "Epoxy," Mod. Plastics Enc., McGraw Hill, N.Y. pp. 18 & 23 (1981).
Volk, H. F., "Carbon", Mod. Plastics Enc., McGraw Hill, N.Y. pp. 171-172 (1981).
L. A. Mondy et al., "Measurements of the Viscosities of Suspensions of Oriented Rods Using Falling Ball Rheometry," Int. J. Multiphase Flow, vol. 16, No. 4, pp. 651-662 (1990).
G. K. Batchelor, "The Stress Generated in a Non-Dilute Suspension of Elongated Particles by Pure Straining Motion," J. Fluid Mech., vol. 46, Part 4, pp. 813-829 (1971).
E. S. G. Shaqfeh et al., "The Effect of Hydrodynamic Interactions on the Orientation of Axisymmetric Particles Flowing Through a Fixed Bed of Spheres or Fibers," Phys. Fluids 31 (4), pp. 728-743 (1988).

*Primary Examiner*—Melvyn I. Marquis
*Assistant Examiner*—D. R. Wilson
*Attorney, Agent, or Firm*—Ray G. Wilson

[57] ABSTRACT

High strength material composite structures are formed with oriented fibers to provide controlled anisotropic fibers. Fibers suspended in non-dilute concentrations (e.g., up to 20 volume percent for fibers having an aspect ratio of 20) in a selected medium are oriented by moving an axially spaced array of elements in the direction of desired fiber alignment. The array elements are generally perpendicular to the desired orientation. The suspension medium may also include sphere-like particles where the resulting material is a ceramic.

3 Claims, 3 Drawing Sheets

ANISOTROPIC FIBER ALIGNMENT IN COMPOSITE STRUCTURES

BACKGROUND OF INVENTION

This invention relates to composite materials, and more particularly to selectively orienting fibers in composite materials. This invention is the result of a contracts with the Department of Energy (Contract No. W-7405-ENG-36 and Contract No. DE-AC04-76DP00789).

Composite materials are formed from two or more materials in order to exploit characteristics of each of the included materials. In one embodiment, elongated materials, "fibers", are embodied in a surrounding matrix of a viscous material or in a ceramic precursor to add strength characteristics to the final product. The composite material characteristics are generally isotropic where the fibers are oriented randomly in the surrounding matrix. However, in many applications, the desired characteristics are anisotropic wherein the fibers are in a preferred orientation.

Fiber orientations have been obtained by various techniques. U.S. Pat. No. 4,560,603, issued Dec. 24, 1985, teaches an applied electromagnetic field to orient fibers of selected materials. Another prior art process provides some fiber orientation during extrusion from a shaped die.

There have also been theoretical articles related to the orientation of elongated particles. For example, G. K. Batchelor, "The Stress Generated in a Non-Dilute Suspension of Elongated Particles by Pure Straining Motion," 46 J. Fluid Mech. No. 4, pp. 813-829 (1971), theorizes that elongated particles in a dilute suspension tend to become parallel to the direction of the greatest principal rate of extension when subjected to a pure straining motion. There is no suggestion of the application of these principles to controlled fiber alignment.

E. S. G. Shaqfeh et al., "The Effect of Hydrodynamic Interactions on the Orientation of Axisymmetric Particles Flowing Through a Fixed Bed of Spheres or Fibers," 31 Phys. Fluids, No. 4, pp. 728-743 (April 1988), theoretically examines the hydrodynamic interaction between a dilute suspension of axisymmetric particles, i.e., a solution with no hydrodynamic interaction between particles, and fixed dilute beds of spheres and fibers. It is suggested that the long axis of prolate particles (particles with an aspect ratio $>1$) will tend to align with the bulk fluid flow through the bed. It is also suggested that the same steady state flow alignment will be obtained from the dilute particles when a fiber bed is provided with the fibers oriented perpendicular to the inlet flow. As used herein, a dilute suspension is defined by $a_r^2\phi<1$, where $a_r$ is the fiber aspect ratio (length/diameter) and $\phi$ is the fiber volume concentration. Shaqfeh has no discussion on the possible interactions in a non-dilute concentration of fibers useful in composite materials.

The orientation of fibers at volume concentrations less than 5% as a non-dilute suspension in a neutrally buoyant suspension is discussed in Mondy et al., "Measurements of the Viscosities of Suspensions of Oriented Rods Using Falling Ball Rheometry," 16 Int. J. Multiphase Flow, No. 6, pp 651-662 (1990). Alignment was obtained by passing a random planar grid through the suspension along the direction of preferred alignment and the effects of orientation on viscosity were examined.

The problem of controlled fiber alignment in composite materials to produce anisotropic material properties is addressed by the present invention and a process is provided for aligning non-dilute suspensions of fibers in suspension media, including suspensions of generally spherical particles such as ceramics.

Accordingly, it is an object of the present invention to provide a method and apparatus for controlled alignment of a non-dilute suspension of fibers in a suspension medium.

Yet another object of the invention is to provide anisotropic fiber characteristics in a suspension of ceramic particles.

One other object of the invention is to provide a fixture for inducing an anisotropic alignment of fibers in a suspension medium.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, the invention may comprise moving a random mesh array of at least two axially spaced flow elements relative to a non-dilute suspension of fibers in a medium, where the flow elements are perpendicular to the direction of relative movement and the fibers preferentially align their elongated axes with the direction of relative movement.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings.

DETAILED DESCRIPTION OF THE INVENTION

Figure 1:
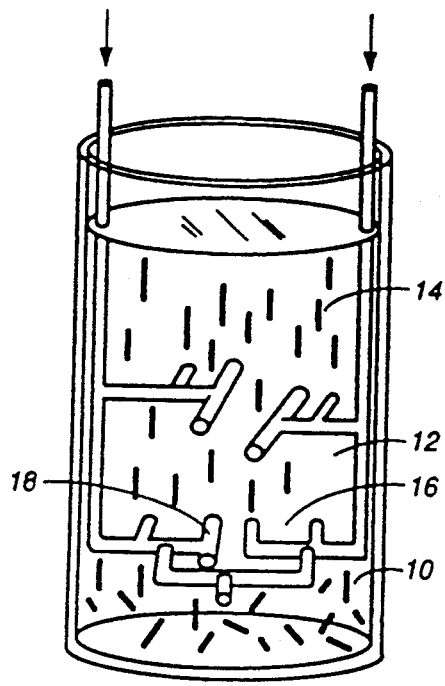
FIG. 1 is a pictorial illustration of an orienting fixture according to the present invention.

Referring now to FIG. 1, there is pictorially depicted a fixture for preferentially aligning fibers in a suspension medium for providing anisotropic behavior in the resulting composite material when the suspension medium cures or otherwise hardens. The suspension of fibers 10 in suspension medium 12 is initially isotropic, or randomly oriented. A grid fixture having random mesh 16 was passed through isotropic suspension 10 in a direction parallel to a desired orientation of the fibers 14. Mesh 16 is comprised of an axially spaced array of planar flow members 18 oriented generally perpendicular to the selected direction of fiber 14 orientation. As used herein, "perpendicular" or "generally perpendicular" means ±15° from a true perpendicular direction. Mesh 16 is then moved through suspension medium 12 in the desired direction for the alignment of fibers 10, 14. After each pass through the bulk volume, mesh 16 is rotated and again passed through the suspension. The sequence of rotation and relative movement is repeated until no further fiber alignment is observed.

A preferred mesh has elements axially spaced along the direction of relative movement with the distance between adjacent elements being greater than a fiber length. The exact geometry of mesh 16 is not otherwise critical, with some functional design considerations discussed below. A diameter for the flow elements of 0.25" was used to obtain the experimental results presented below.

In a model suspension a fiber suspension was prepared from fibers or rods that were 31.65 mm long × 1.596 mm diameter of polymethyl methacrylate with a resulting aspect ratio of about 20. Non-dilute suspensions are obtained at fiber volume concentrations of >0.2% at these aspect ratios. These fibers are rigid and sufficiently large that Brownian effects are neglected. The fibers were neutrally buoyant in the suspending liquid at a temperature of 20.6° C. The viscosity of the suspending fluid was 11.15 Pa.s at 20.4° C. and the fluid is Newtonian for values of shear in a range of interest. Thus, the suspending fluid maintained the orientation of the fibers over long periods of time to enable a measure of the orientation to be obtained. The model system was varied to include spheres with a diameter of 3.092 mm to simulate a precursor medium used in forming ceramics.

Yet another system was formed with carbon fibers in an epoxy resin suspension. The carbon fibers were about 8 microns in diameter and from 1–10 mm long (aspect ratios from 120 to 1200). At these aspect ratios, non-dilute suspensions are obtained at fiber volume concentrations much less than 1%. The epoxy resin system is not neutrally buoyant since the density of the carbon fibers is about 50% greater than the suspending epoxy resin mixture. The density match between the carbon fibers and the epoxy resin fluid was still adequate to provide for curing the epoxy resin before the fibers settled a distance equal to the length of one fiber.

Table A depicts the various systems in which fiber alignment was obtained by relatively moving a mesh element through the system in accordance with the present invention.

TABLE A

| System | Aspect Ratio | % Spheres | % Rods |
|--------|--------------|-----------|--------|
| 1 | 20 | 0 | 2 |
| 2 | 20 | 0 | 5 |
| 3 | 20 | 30 | 10 |
| 4 | 20 | 40 | 5 |
| 5 | 20 | 36 | 12 |
| 6 | 20 | 0 | 20 |
| 7 | 120 | 0 | ≦5 |
| 8 | 1200 | 0 | ≦1 |

Figure 2A:
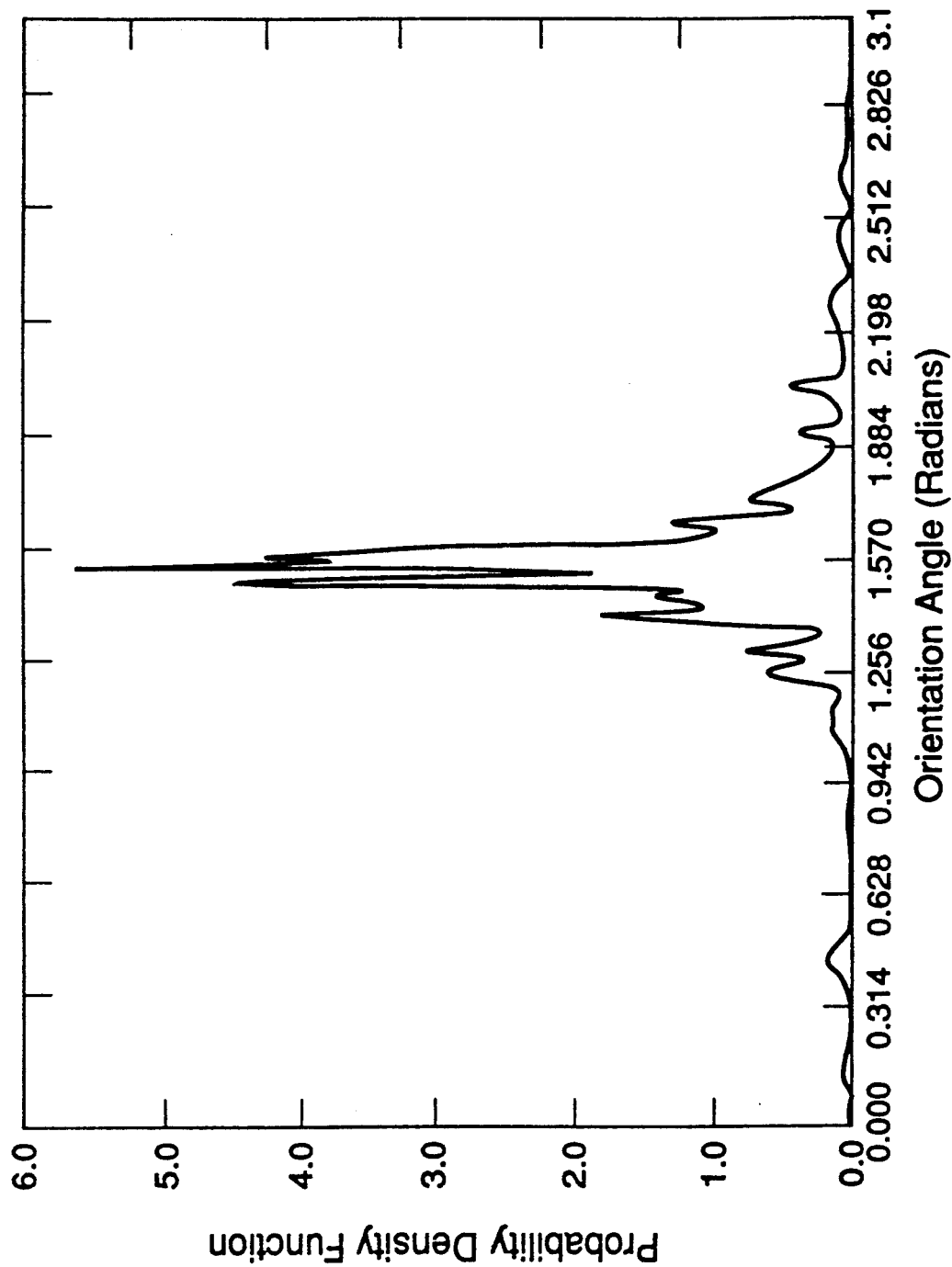
FIGS. 2A and 2B graphically depict the orientation obtained with the fixture shown in FIG. 1 at two different fiber concentrations.
Figure 2B:
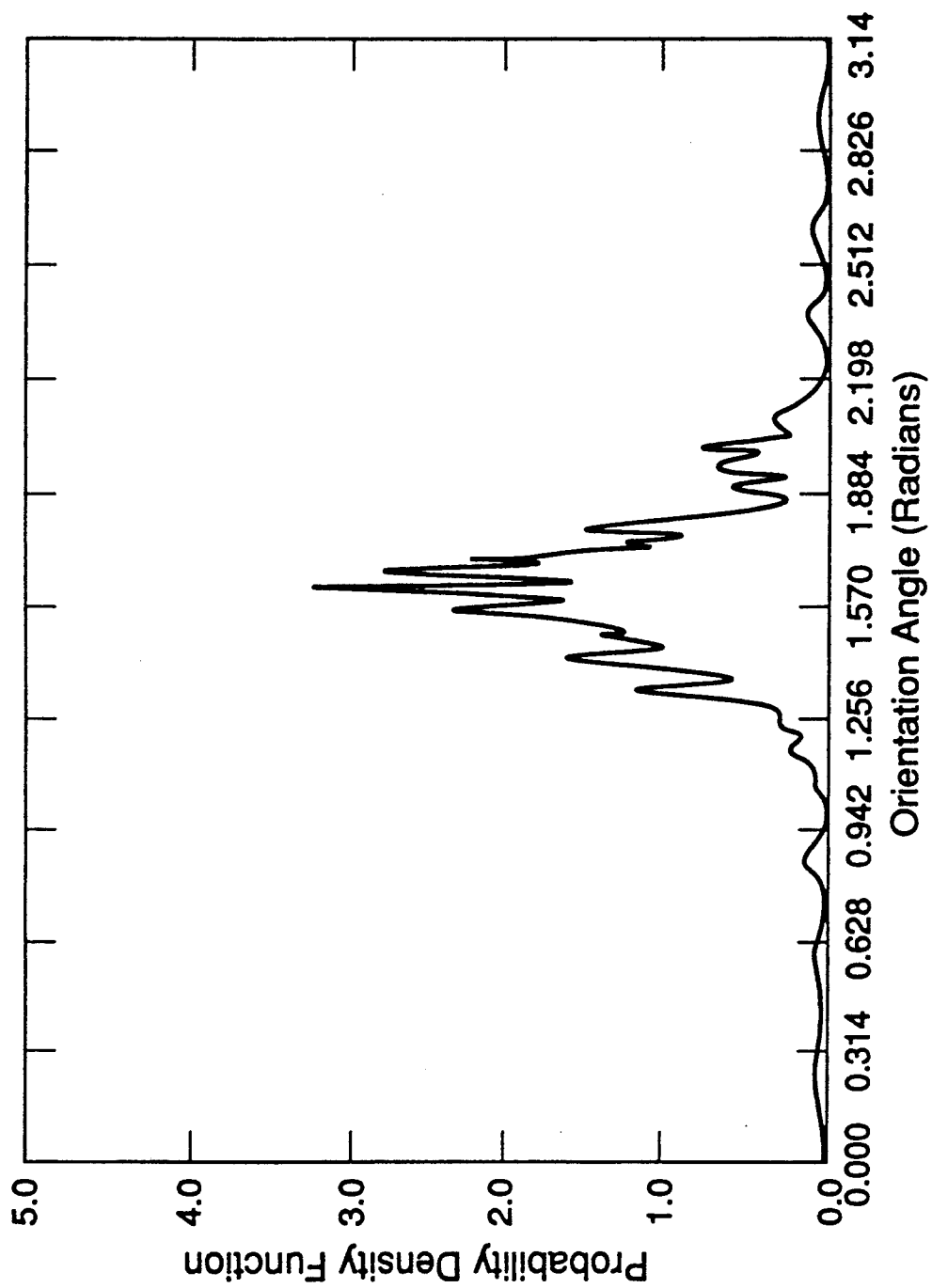

FIGS. 2A and 2B depict the fiber alignment obtained for non-dilute neutrally buoyant suspensions of fibers at volume concentrations <5%. Systems 3, 4, and 5 were composite systems with fibers and spheres to simulate a ceramic system. System 6 was a relatively high concentration system. Systems 7 and 8 were suspensions of fiber rods in epoxy resin and were not neutrally buoyant. High aspect ratio carbon fibers were included.

In all systems a mesh was passed through the system a number of times until the fibers were aligned. By "aligned" is meant a visual indication of alignment at least as good as for systems 1 and 2, which were quantified. FIGS. 2A and 2B were obtained from a Fourier transform of a high contrast digital image produced from a photograph of the fibers in systems 1 and 2, respectively, with the sample oriented for a view of at least 100 fibers. FIGS. 2A and 2B show that the fibers were generally aligned at an angle of 90°, i.e., ±15° from the direction of motion of mesh 16. Indeed, 95% of the fibers are aligned in generally the same direction (±4.5 degrees).

System 6 included a fiber volume concentration of 20% and appeared to represent about the highest volume concentration that could be processed in accordance with the present invention. The fibers tended to form mats and be removed by the mesh at higher concentrations.

Figure 3:
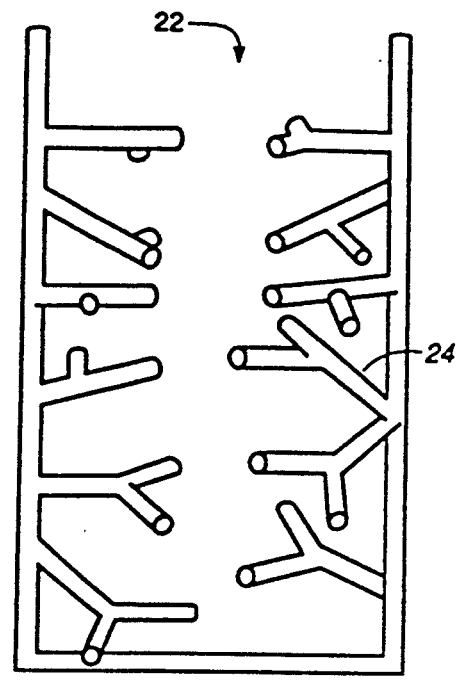
FIG. 3 is a pictorial illustration of another embodiment of the fixture shown in FIG. 1.

In one particular application of fiber alignment discussed above, fibers may be used to improve the strength characteristics of ceramics. However, a ceramic suspension initially consists of a concentration of sphere-like particles within which the fibers must be aligned. Suspensions of spheres and fibers, systems 3–5 of Table A, have been aligned using a fixture as depicted in FIG. 3. As shown in FIG. 3, a staggered mesh 22 has flow elements 24 depending from the fixture and perpendicular to the direction of relative movement between flow elements 24 and the suspension. A staggered arrangement of flow elements 24 is desired to preclude movement of the suspension materials with the flow elements. In all cases the fibers were initially randomly oriented and became preferentially oriented parallel to the direction of movement of flow elements 24. Once alignment was achieved, the spheres tend to maintain the fiber alignment even when the fibers settled to the bottom of the suspension.

Yet other suspensions were formed with carbon fibers in an epoxy resin medium, systems 7 and 8 of Table A. These suspensions were not neutrally buoyant and contained high aspect ratio fibers. Alignment was readily maintained since the time required for the fibers to settle a distance equal to the length of one fiber was much greater than the time required to carry out the alignment operation and to cure the epoxy resin, i.e., the settling time was at least 10 times greater than the curing time.

Figure 4:
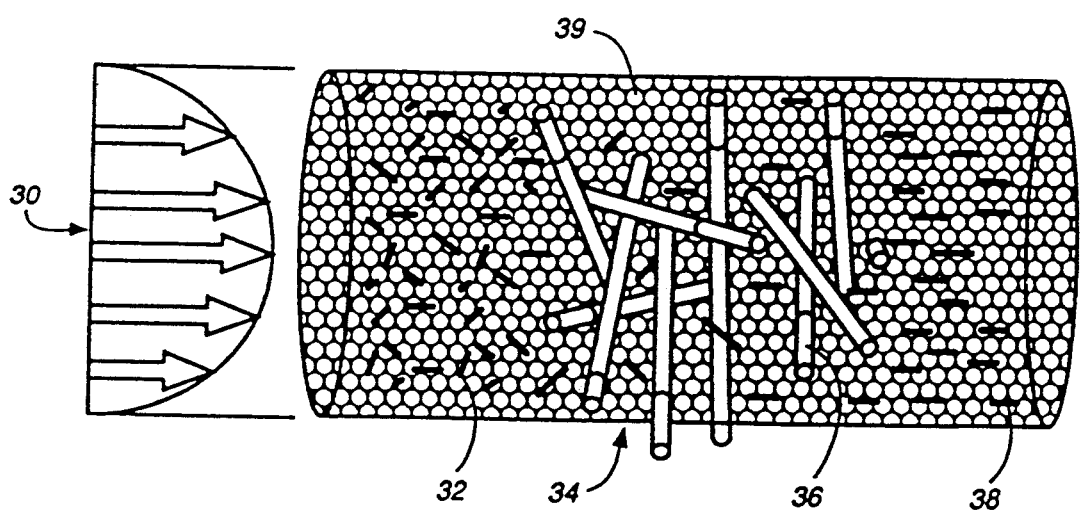
FIG. 4 is a pictorial illustration of a fixture for continuous processing of isotropic fiber suspensions.

The fixtures shown in FIGS. 1 and 3 are primarily useful in batch processing of fiber and/or suspensions. FIG. 4 pictorially depicts a possible application of mesh elements to a continuous process. A material flow 30 of randomly oriented fibers 32 in a selected suspension is passed through a staggered mesh array 34 having flow elements 36 oriented perpendicular to the direction of material flow 30. After passing through array 34, fibers 38 are preferentially aligned perpendicular to the flow elements 36 and along the direction of material flow 30.

The design of mesh elements 16, 24, and 36 shown in FIGS. 1, 3, and 4, respectively, includes some functional considerations. The open spaces between mesh elements should be large enough to allow the suspension to flow freely through the mesh so that fibers will not be removed from the suspension. A spacing that is greater than the fiber length is generally sufficient. For example, a spacing of five times (5×) the fiber length has been used successfully. Mesh elements can be generally any size and shape, but the length of the elements are preferably greater than the fiber length.

Mesh elements are preferably arranged so that a straight line through the mesh in the direction of relative suspension movement will pass through at least one mesh element. This requires at least two staggered layers of elements with a spacing between layers that is greater than the fiber length.

It will be appreciated that fiber volume concentrations higher than 20% may be obtained by removing excess suspension medium after the fibers are aligned. For example, excess epoxy resin might be removed through an overlying fabric-like material to concentrate the aligned fibers in the remaining epoxy resin before the epoxy resin has cured.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method for producing anisotropic material properties in a composite material, including the steps of:

forming a non-dilute concentration of elongated fibers in the range of 5 to 20 volume % in a suspension medium; relatively moving said non-dilute concentration through an array of flow elements staggered along an axis connecting said flow elements and having a distance between adjacent ones of said flow elements greater than a length of said elongated fibers, wherein said relative movement is in a direction perpendicular to said flow elements to orient the elongated axis of said fibers parallel to said relative movement; and increasing the concentration of said elongated fibers by removing some of said suspension medium after said fibers are oriented in said suspension medium.

2. A method according to claim 1, wherein said suspension medium includes sphere-like particles.

3. A method according to claim 1, wherein said elongated fibers are carbon fibers.

* * * * *